(12) United States Patent
Wendelbo et al.

(10) Patent No.: US 6,334,994 B1
(45) Date of Patent: Jan. 1, 2002

(54) MICROPOROUS CRYSTALLINE SILICO-ALUMINO-PHOSPHATE COMPOSITION, CATALYTIC MATERIAL COMPRISING SAID COMPOSITION AND USE OF THESE FOR PRODUCTION OF OLEFINS FROM METHANOL

(75) Inventors: Rune Wendelbo; Duncan E. Akporiaye; Anne Andersen; Martin Ivar Dahl, all of Oslo; Helle Brit Mostad, Eiksmarka; Terje Fuglerud; Steinar Kvisle, both of Porsgrunn, all of (NO)

(73) Assignee: Norsk Hydro ASA, Oslo (NO)

( * ) Notice: Subject to any disclaimer, the term of this patent is extended or adjusted under 35 U.S.C. 154(b) by 0 days.

(21) Appl. No.: 09/284,182

(22) PCT Filed: Oct. 8, 1997

(86) PCT No.: PCT/NO97/00272

§ 371 Date: Jun. 10, 1999

§ 102(e) Date: Jun. 10, 1999

(87) PCT Pub. No.: WO98/15496

PCT Pub. Date: Apr. 16, 1998

(30) Foreign Application Priority Data

Oct. 9, 1996 (NO) .............................................. 964276

(51) Int. Cl.[7] .......................... C01B 39/00; B01J 27/182; C07C 1/207

(52) U.S. Cl. ..................... 423/718; 423/305; 423/306; 423/DIG. 30; 502/214; 585/639; 585/640

(58) Field of Search ................................. 423/718, 305, 423/306, DIG. 30; 502/214; 585/640, 639

(56) References Cited

U.S. PATENT DOCUMENTS

| | | | |
|---|---|---|---|
| 5,437,781 A | 8/1995 | Wilson | 208/46 |
| 5,609,843 A | 3/1997 | Wendelbo | 423/306 |
| 5,663,471 A | 9/1997 | Kvisle et al. | 585/634 |

FOREIGN PATENT DOCUMENTS

| | | |
|---|---|---|
| WO | WO 9505342 | 2/1995 |

OTHER PUBLICATIONS

"In re Grose and Flanigan case law" (CCPA 210 USPQ 57) Jan. 1979.*

Simmen et al., "The structure determination and Rietveld refinement of the aluminiophosphate $AlPO_4$ –18", Zeolites, vol. 11, Oct. 1991, pp. 654–661.

* cited by examiner

Primary Examiner—Thuan D. Dang
(74) Attorney, Agent, or Firm—Wenderoth, Lind & Ponack, L.L.P.

(57) ABSTRACT

Microporous crystalline silico-alumino-phosphate (SAPO) compositions, catalytic materials comprising the composition, and use of these for production of olefins from methanol. The catalysts contain silico-alumino-phosphate materials with AEI/CHA-mixed phase composition. The catalysts have prolonged life compared to those belonging to the prior art.

15 Claims, 1 Drawing Sheet

Figure 1:
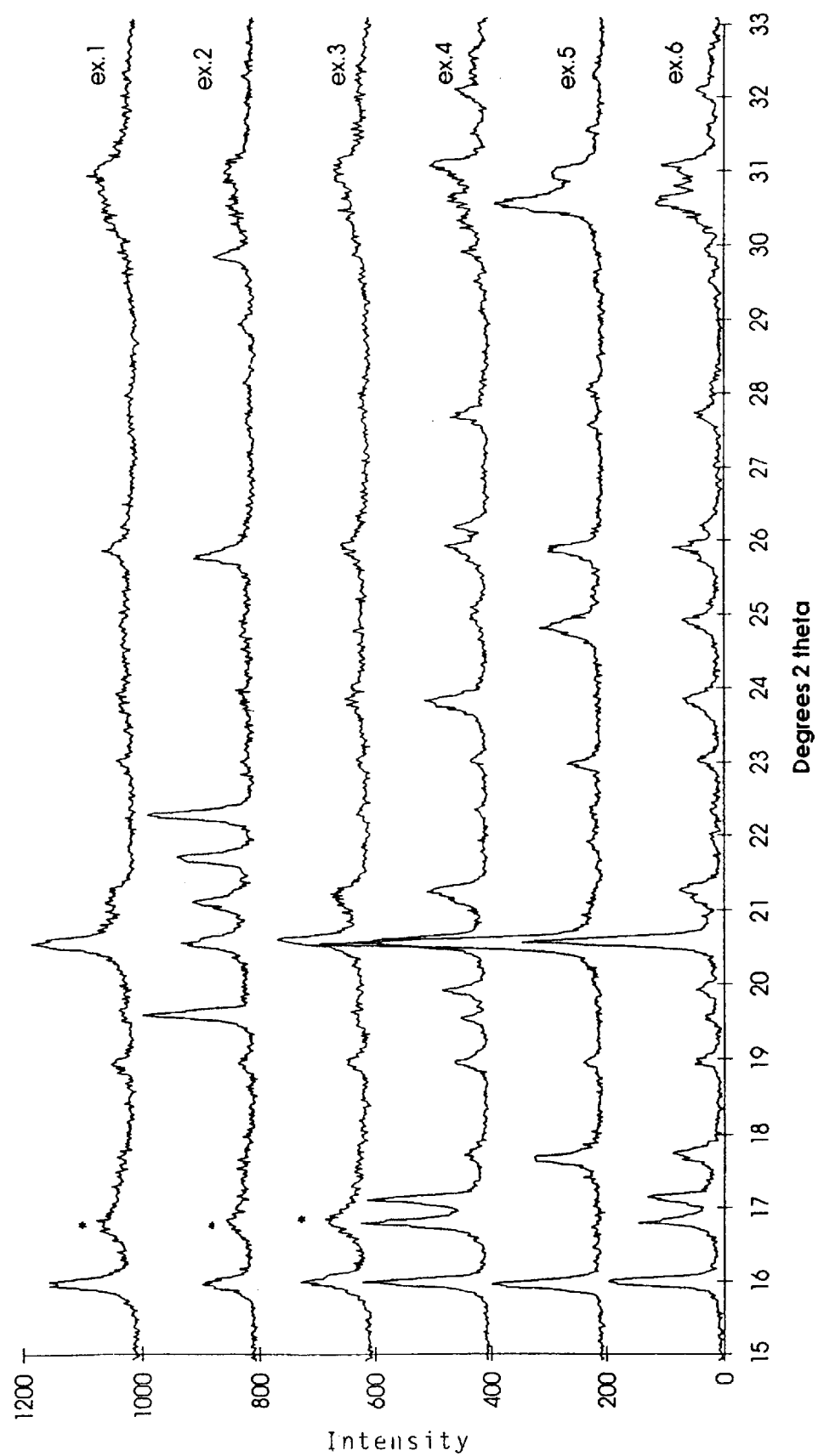

MICROPOROUS CRYSTALLINE SILICO-ALUMINO-PHOSPHATE COMPOSITION, CATALYTIC MATERIAL COMPRISING SAID COMPOSITION AND USE OF THESE FOR PRODUCTION OF OLEFINS FROM METHANOL

This application is a 371 application of International Application No. PCT/NO097/00272 filed Oct. 8, 1997.

The invention concerns catalysts for converting methanol to olefins comprising silico-alumino-phosphate (SAPO) materials with AEI/CHA-mixed phase composition.

From Norwegian Patent No. 169 380 (corresponds to U.S. Pat. No. 4,440,871) microporous crystalline silico-alumino-phosphates and a procedure for synthesising such products. These products are known have a three-dimensional space lattice built up from $PO_2+$, $AlO_2-$ and $SiO_2$ tetrahedral units, whose most important chemical composition on a water-free basis is:

$$mR:(Si_xAl_yP_z)O_2$$

where "R" represents at least one organic template material which is present in the intracrystalline pore system; "m" is the number of moles of "R" present per mole of $(Si_xAl_yP_z)O_2$ and m has a value between 0 and 0.3, the maximum value in each case being dependent on the molecular dimensions of the template material and the available pore volume in the silico-alumino-phosphate structure in question; "x", "y" and "z" are molar fractions of silicon, aluminium and phosphorus respectively, present as tetrahedral oxides. The minimum value of "x", "y" and "z" is 0.01, and the maximum value of "x" is 0.98, of "y" 0.6 and of "z" 0.52. The minimum value of "m" in the formula above is 0.02.

The reaction mixture is achieved by combining at least one part each of the aluminium and phosphorus sources in the absence of the silicon source. Then the resultant mixture is reacted with the remaining components to get the total reaction mixture.

The reaction mixture is placed in a pressure vessel for shaking and then heating under autogenic pressure to a temperature of at least 100° C., and preferably between 100 and 260° C., until a crystalline silico-alumino-phosphate is obtained. The product is extracted in any appropriate way, for example by centrifuging or filtering.

From our own Norwegian Patent No. 174341 an improved method of producing silico-alumino-phosphate catalysts for the conversion of methanol into light olefins such as ethylene and propylene (the MTO reaction) is known. The improved method of synthesis can be used to control chemical composition of the silico-alumino-phosphates, especially the silicon content. In particular, it was found that catalysts that are more stable towards deactivation by "coking" can be synthesised, which is very important for the design of an MTO process based on the synthesised silico-alumino-phosphates.

From our own Norwegian Patent Application No. 932915 a microporous crystalline silico-alumino-phosphate with theoretical composition on a water-free basis after synthesis and calcination:

$$H_xSi_xAl_yP_zO_2$$

where x has a value between 0.005 and 0.1 and y and z are values between 0.4 and 0.6, is known. The product has AEI-structure and has acidic properties. The product is useful as sorbent and as catalyst for olefin production from methanol.

A problem related to all the catalysts known from the above mentioned prior art is that the lifetime of the catalysts is limited.

Thus, a main object of the invention is to produce a catalyst with prolonged life compared to those belonging to the prior art.

This object and other objects of the invention are achieved as defined in the patent claims listed at the end of this application.

The present invention concerns a crystalline silico-alumino-phosphate microporous material containing at least the two phases AEI and CHA, the theoretical, average chemical composition of which, on a water-free base after synthesis and calcination, is:

$$H_xSi_xAl_yP_zO_2$$

where x has a value between 0.005 and 0.1 and y and z are values between 0.4 and 0.6, and "x", "y" and "z" are mol fractions of silicon, aluminium and phosphorous respectively, present as tetrahedric oxides. The present invention further concerns the use of said material for the production of light olefins from methanol, for which said material surprisingly has been found to be superior to materials of the same chemical composition with either pure AEI or pure CHA phase, as illustrated in examples below.

The manufactured catalytic material, called RUW-19, consists of small, irregularly shaped particles which, after calcination in air at 550° C. for 4 hours, produce a characteristic x-ray diffractogram which at least includes the reflections stated in Table 1, all of which are reflections characteristic of either the AEI-phase, the CHA-phase or both phases, and from which the reflection between 2 theta=9.3 and 9.5 is always the strongest.

TABLE 1

| 2θ | d(Å) |
|---|---|
| 9.3–9.5 | 9.3–9.4 |
| 10.4–10.6 | 8.3–8.5 |
| 12.7–12.9 | 6.8–7.0 |
| 13.8–14.0 | 6.3–6.4 |
| 15.9–16.1 | 5.5–5.6 |
| 16.7–16.9 | 5.2–5.3 |
| 18.9–19.0 | 4.6–4.7 |
| 20.5–20.7 | 4.3–4.4 |
| 21.0–21.3 | 4.1–4.3 |
| 23.7–24.0 | 3.7–3.8 |
| 25.7–26.0 | 3.4–3.5 |
| 30.9–31.1 | 2.8–2.9 |

The product has acidic properties as demonstrated by the fact that>0.05 mmoles $NH_3$/g material sorbed at 100° C. is desorbed at temperatures>300° C. when it is heated in flowing helium at a ramp rate of 10° C./min.

The content of Si in the calcined product is in the range between 0.2 and 3% weight, preferably between 0.4 and 1.2. The manufactured product has pore openings and channels of 4–5 Å diameter, and cavities, the smallest size of which is>5 Å, as found for both the AEI- and the CHA-structures.

RUW-19 is manufactured from a mixture of reactive sources of $SiO_2$, $Al_2O_3$ and $P_2O_5$ and an organic template material. Said mixture is manufactured by combining at least one portion of the Al-source and the P-source with water, the Si-source and the organic template material. The reagents can be added in different orders and quantities, and from different sources, but Al-isopropoxide, phosphoric acid, colloidal silica and tetraethylammonium hydroxide have proved to be particularly useful sources of Al, P, Si and organic template material, respectively. It has further proved convenient to mix the Al-source with the P-source and water first, and thereafter adding either the Si-source or the organic template material and finally the remaining reagent. The Si-source may also be dissolved in the organic template solution prior to blending with the other reagents. It is convenient to stir or shake the mixture between each addition, but this is not necessary. All the reagents may well be added before stirring or shaking starts. After so preparing the precursor gel it is put into a steel autoclave and after a short or long ageing period at room temperature the autoclave is heated to a maximum temperature between 180 and 260° C., for at least 1 hour, and preferably for more than 2 hours. It is important that the autoclave is either shaken, stirred or rotated during the entire process of ageing and crystallisation.

RUW-19 comprises as major constituents at least the two silico-alumino-phosphate phases with AEI- and CHA-structures, and the material is not well defined regarding the ratios between the different phases. Any silico-alumino-phosphate prepared in one batch crystallisation exhibiting x-ray-reflections characteristic of both phases AEI and CHA are defined as RUW-19 catalytic material. This means in practice that the ratio between the two phases are always between 0.1 and 10, because otherwise the identification of the minor constituent becomes uncertain. Physical mixtures of the two phases AEI and CHA prepared by mixing samples of the two pure materials are not defined as RUW-19.

Typically, RUW-19 is obtained as a product in preparations where some of the critical parameters of a SAPO-34-synthesis (see comparative example 5) are combined with some critical parameters of a SAPO-18-synthesis (see comparative example 4). This does not imply however that RUW-19 is always obtained in such preparations. RUW-19 is obtained only when certain critical parameters of a typical SAPO-34-preparation are combined with certain critical parameters of a typical SAPO-18-preparation, as described and exemplified below. In addition to this there are also some features characteristic of a typical RUW-19 preparation which are not found in typical preparations of SAPO-34 nor of SAPO-18, such as relatively short synthesis times and relatively high synthesis temperatures and the special decantation step described in example 1 and other minor details as can be seen from the examples and the comparative examples and other relevant publications in the field.

SAPO-18/SAPO-34 mixed phase materials can generally be obtained in a much wider range of synthesis conditions than the two pure phases, but not all mixed phase samples are necessarily "long life—low coke" MTO-catalysts.

SAPO-18/SAPO-34 mixed phase MTO-catalysts are obtained by including one or two, but not all three, of the following synthesis steps 1–3, departing from a typical SAPO-34 synthesis as described in the second comparative example (Example 5). If none of these steps are included a pure SAPO-34 will result, and if steps (1–3) are performed, a pure, or nearly pure SAPO18 is obtained.

1. Water and phosphoric acid, and optionally HCl should be added to the Al-isopropoxide one by one, with mixing between each addition. (Column 4 in Table 8).
2. $SiO_2$-content in the gel should be below 5%, i.e. Si/(Al+P+Si)<0.05, and preferably below 0.04 and above 0.01, and most preferably between 0.015 and 0.025. (Column 2 in Table 8). The preferred silica source in a colloidal silica sol.
3. After addition of the silica source the amount of liquid in the gel should be reduced by one or more of the following methods; a) filtration, or b) drying or c) discharge of supernatant after sedimentation. (Column 6, 7 and 8 in Table 8).

Some further synthesis steps favour the crystallisation of mixed phases when not all three of the above steps are performed. These additional steps are as follows;

4. Cooling of the gel under running water while shaking the bottle gently. (Column 5 in Table 8).
5. Crystallisation temperature (set point on T-controller) should be at least 200° C. but preferably as high as in the 250 to 260° C.-range. Pure phases are preferably made in the 200 to 230° C.-range. (Column 9 in Table 8).
6. Crystallisation time should be shorter the higher the temperature. In the 250 to 260° C.-range the time should preferably be from 2 to 5 hours. Pure phases require a longer crystallisation time at lower temperatures. (Column 10 in Table 8).

A characteristic of the mixed phase samples in general is that they contain more than one crystalline phase which can be identified by XRD. Not all such mixed phases are as good MTO-catalysts as the mixed phase samples described in the present invention. The best samples, i.e. the samples with the longest catalytic lifetime (defined as described in Examples 1–3) and the lowest overall coke selectivity have certain characteristics in common, that other mixed phase samples do not have. One such characteristic is that they contain at least the phases SAPO-18 and SAPO-34, and may also contain other phases such as SAPO-5 having the AFI-structure, or dense phases in limited amounts.

Another such characteristic is that they have XRD-profiles with only one broad feature in the region between 16.6 and 18 degrees 2 theta as illustrated in FIG. 1, marked with an asterisk. Pure phases (Example 4 and 5) and post-synthesis prepared mixed phase samples (Example 6) do not have such a broad feature, but have instead at least one relatively sharp peak in the same region.

The invention is further explained in the examples and figure below.

FIG. 1 shows the XRD-traces of the 15–33 degrees 2 theta region for the products of examples 1–6.

Examples 1–3 show synthesis of SAPO-18/SAPO-34-"intergrowths" according to the invention. Examples 4–6 are comparative examples.

X-ray diffraction was performed on a Siemens diffractometer type D 5000 with Ni-filtered CuK-radiation and run in stepscan mode with steps 0.02 degrees and 1 sec. collect time per step. The intensities in Tables 2–7 have been given in letter codes according to the following scale:

| Letter code | Intensity (counts) |
| --- | --- |
| vvs | >1000 |
| vs | 500–999 |
| s | 250–499 |
| m | 100–249 |
| w | 40–99 |
| vw | <39 |

Identification and Quantification of the Different Phases

The AEI and CHA phases were identified and semi-quantified by XRD. For quantification the heights of two diagnostic peaks were measured; the 5.5 Å-peak for the CHA-phase and the 5.2 Å-peak for the AEI-phase, and divided by the heights of the same peaks in pure samples (Example 4 and 5), arbitrarily assessed 100% crystalline.

The quantities of the different phases in the examples and otherwise in the text are thus always to be understood as determined according to this operational method. In the examples the percentages given refer to the sum of the crystalline material, whereas the values given in table 9 refer directly to the peak intensities compared to Example 4 and 5.

EXAMPLE 1
(MTO-RUW-356.)

An aluminium phosphate-gel was first prepared by adding 212 g of a solution consisting of 55 g 85% $H_3PO_4$ and 151 g distilled water and 6 g HCl to 109 g of Al-isopropoxide in a 1 liter plastic bottle. The mixture was shaken for one minute, and then transferred to a closed Büchner funnel and evacuated by water suction. The mixture started to boil, and was left to dry for 19 hours, so its weight was reduced from 321 to 135 g. Thereafter 156g 40% TEAOH was added, shaken for one minute and thereafter 4 g of Ludox LS was added and again shaken for one minute, resulting in a gel with the composition, expressed in terms of the molar oxide ratios, excluding water and isopropanol:

$$0.79 TEA_2O:1Al_2O_3:0.075SiO_2:0.89P_2O_5$$

The gel was thereafter stirred for one hour with magnetic stirrer. The resulting mixture, weighing 293 g was equally divided in 3, and one third was transferred to a Teflon lined autoclave. The autoclave was then put in an Al-heating block, and heated to 260° C. After 2 hours the autoclave was withdrawn and immersed in water for cooling. The content was centrifuged, and the solid redispersed in distilled water once, and again centrifuged (3600 rpm). The sediment was dried at 100° C. over night. Dry weight of the solid product was 8.4 g, which was only about 50% of the used reactants, on oxide basis. A portion of the product was calcined in dry air at 550° C. for 5 hours. After calcination, the silico-alumino-phosphate mixed phase product has a crystalline structure whose X-ray powder diffraction pattern shows the following characteristic lines as indicated in Table 2 below.

TABLE 2

| 2θ | d(Å) | I |
|---|---|---|
| 9.41 | 9.39 | vvs |
| 10.55 | 8.38 | w |
| 12.83 | 6.90 | m |
| 13.30 | 6.65 | w |
| 13.89 | 6.37 | vw |
| 15.96 | 5.55 | m |
| 16.77 | 5.28 | w |
| 18.94 | 4.68 | w |
| 19.62 | 4.52 | vw |
| 20.55 | 4.32 | m |
| 21.17 | 4.19 | w |
| 23.04 | 3.86 | w |
| 23.81 | 3.73 | vw |
| 25.89 | 3.44 | w |
| 30.99 | 2.88 | w |

The X-ray diffraction analysis revealed that the crystalline product was composed of approximately 60% SAPO-34 and 40% SAPO-18.

The composition of the solid, calcined product was established, by means of chemical analysis, as $$46.6\% Al_2O_3, 5.0\% SiO_2, 48.4\% P_2O_5,$$

which produced a product composition, with regard to the main components, of $Si_{0.05}Al_{0.54}P_{0.41}O_2$. These results showed that Si was enriched in the crystalline product as compared to the composition of the gel.

EXAMPLE 2
(MTO-RUW-305.)

An aluminium phosphate-gel was first prepared by adding a solution of 15.4 g of 85% phosphoric acid, 0.4 g of 37% HCl and 36.7 g of distilled water to 27.2 g of aluminium isopropoxide in a ¼ liter PE-bottle. The bottle was shaken for 1 minute. Next 1.1 g of Ludox LS colloidal silica was added, and the bottle was again shaken for 1 minute. Then 49.2 g of 40% TEAOH was added. The composition of the gel, expressed in terms of the molar oxide ratios, was:

$$1TEA_2O:1Al_2O_3:0.08SiO_2:1P_2O_5:59H_2O:C_3H_7OH.$$

The bottle was shaken for 1 minute, and left standing for ½ minute resulting in a separation of phases in the gel. 25 ml of the relatively clear supernatant was discharged and the rest of the mixture was transferred to a teflon-lined autoclave, which was put in an aluminium heating block on a shaking-board at 90° C. for 2 hours whereafter the temperature was increased to 260° C., and the mixture was heated for 4 hours at this temperature. After cooling the product was washed with distilled water and centrifuged. The sediment in the centrifuge tube was dried at 100° C. over night.

A portion of the product was calcined in dry air at 550° C. for 5 hours. After calcination, the silico-alumino-phosphate mixed phase product has a crystalline structure whose X-ray powder diffraction pattern shows the following characteristic lines as indicated in Table 3 below.

TABLE 3

| 2θ | d(Å) | I |
|---|---|---|
| 7.33 | 12.05 | vvs |
| 9.42 | 9.33 | vvs |
| 10.51 | 8.41 | w |
| 12.78 | 6.92 | m |
| 13.86 | 6.38 | vw |
| 14.77 | 5.99 | w |
| 15.97 | 5.54 | w |
| 16.82 | 5.27 | w |
| 18.96 | 4.68 | vw |
| 19.60 | 4.53 | m |
| 20.56 | 4.32 | m |
| 21.11 | 4.20 | m |
| 21.72 | 4.09 | m |
| 22.30 | 3.98 | m |
| 23.94 | 3.71 | vw |
| 25.79 | 3.45 | m |
| 28.95 | 3.08 | vw |
| 29.86 | 2.99 | w |
| 31.02 | 2.88 | w |
| 34.36 | 2.61 | w |
| 35.72 | 2.51 | vw |
| 37.79 | 2.38 | vw |

The X-ray diffraction analysis revealed that the crystalline product was composed of approximately 33% SAPO-5, 22% SAPO-34 and 28% SAPO-18, and an additional 17% of other phases.

EXAMPLE 3
(MTO-RUW-335T.)

An aluminium phosphate-gel was first prepared by adding a solution of 61.6 g of 85% phosphoric acid, 0.8 g of 37% HCl and 146.8 g of distilled water to 109 g of aluminium isopropoxide in a 1 liter PE-bottle. The bottle was shaken for 1 minute and was left for 15 minutes whereafter it was filtered (water suction/black ribbon paper) for 15 minutes. The solid residue was then put in an oven at 100° C. resulting in a dry material with a total weight of 100 g. 50 g of this dry material was added to a mixture of 39.4 g of 40% TEAOH and 2 g of Ludox LS-30 which had been stirred over night. The composition of the gel, expressed in terms of the molar oxide ratios, excluding water and isopropanol, was:

$$0.4TEA_2O:1Al_2O_3:0.075SiO_2:1P_2O_5.$$

The resulting gel was shaken for 1 minute and then transferred to a teflon-lined autoclave, which was put in an aluminium heating block on a shaking-board at 90° C. for over night whereafter the temperature was increased to 260° C., and the mixture was heated for 4 hours at this temperature. After cooling the product was washed with distilled water and centrifuged. The sediment in the centrifuge tube was dried at 100° C. over night, in the tube. When recovered it was discovered that the dry product consisted of a relatively coherent top layer and a relatively powdery bottom layer, and the two layers were separated.

A portion of the top layer of the dry product was calcined in dry air at 550° C. for 5 hours. After calcination, the silico-alumino-phosphate mixed phase product has a crystalline structure whose X-ray powder diffraction pattern shows the following characteristic lines as indicated in Table 4 below.

TABLE 4

| 2θ | d(Å) | I |
|---|---|---|
| 7.32 | 12.07 | w |
| 9.44 | 9.36 | vvs |
| 10.53 | 8.40 | w |
| 12.85 | 6.89 | m |
| 13.34 | 6.63 | w |
| 13.86 | 6.39 | vw |
| 16.02 | 5.53 | m |
| 16.84 | 5.26 | w |
| 18.97 | 4.67 | w |
| 20.60 | 4.31 | m |
| 21.20 | 4.19 | w |
| 22.34 | 3.98 | vw |
| 23.00 | 3.86 | vw |
| 23.86 | 3.73 | w |
| 25.91 | 3.44 | w |
| 27.86 | 3.20 | vw |
| 31.04 | 2.88 | w |

The X-ray diffraction analysis revealed that the crystalline product was composed of approximately 63% SAPO-18, 33% SAPO-34 and 3% SAPO-5.

The composition of the solid, calcined product was established, by means of chemical analysis, as $$47.7\% Al_2O_3, 3.5\% SiO_2, 48.8\% P_2O_5,$$

which produced a product composition, with regard to the main components, of $Si_{0.035}Al_{0.556}P_{0.409}O_2$.

EXAMPLE 4
(SAPO-18.)

(a) 108 g of distilled water was added to 81.6 g of aluminium isopropoxide in a ½ liter PE-bottle. The bottle was shaken for 1 minute. 45 g of 85% phosphoric acid was added, and the bottle was shaken for 1 minute while cooled by running tap-water. Then 0.6 g of 37% HCl was added, and the bottle was again shaken for 1 minute while cooled by running tap-water. Next 3.0 g of Ludox LS colloidal silica was added, and the bottle was again shaken for 1 minute while cooled by running tap-water. The bottle was then left for 15 minutes and subsequently filtered for 10 minutes. During the filtration step the weight of the gel was reduced by 100 g. The filtercake was then divided in 3 portions, each in a 250 ml PE-bottle. To one of these bottles was added 49 g of 40% TEAOH, and the bottle was shaken for 1 minute.

The composition of the gel, expressed in terms of the molar oxide ratios, excluding water, hydrochloric acid and isopropyl alcohol, was:

$$1TEA_2O:1Al_2O_3:0.075SiO_2:0.98P_2O_5.$$

The mixture was then transferred to a teflon-lined autoclave, and left over night on a shaking-board at room temperature. Next day the temperature was increased to 215° C., and the mixture was heated for 120 hours at this temperature. After cooling the product was washed with distilled water and centrifuged.

A portion of the product of part (a) was calcined in dry air at 550° C. for 5 hours. After calcination, the SAPO-18 silico-alumino-phosphate has a crystalline structure whose X-ray powder diffraction pattern shows the following characteristic lines as indicated in Table 5 below.

TABLE 5

| 2θ | d(Å) | I |
|---|---|---|
| 9.43 | 9.38 | vvs |
| 10.54 | 8.38 | s |
| 12.84 | 6.89 | s |
| 13.36 | 6.62 | w |
| 13.86 | 6.39 | vw |
| 15.98 | 5.54 | m |
| 16.80 | 5.27 | m |
| 17.11 | 5.18 | m |
| 17.71 | 5.00 | w |
| 18.97 | 4.67 | w |
| 19.55 | 4.54 | w |
| 19.92 | 4.45 | w |
| 20.57 | 4.31 | m |
| 21.25 | 4.18 | m |
| 22.35 | 3.98 | vw |
| 23.03 | 3.96 | vw |
| 23.82 | 3.73 | m |
| 24.98 | 3.56 | vw |
| 25.88 | 3.44 | w |
| 26.18 | 3.40 | w |
| 27.71 | 3.22 | w |
| 29.14 | 3.06 | vw |
| 29.52 | 3.02 | vw |
| 29.92 | 2.98 | w |
| 30.35 | 2.94 | w |
| 30.63 | 2.92 | w |
| 31.08 | 2.88 | m |
| 31.53 | 2.84 | vw |
| 32.08 | 2.79 | w |
| 32.60 | 2.74 | vw |
| 32.95 | 2.72 | vw |
| 34.58 | 2.59 | vw |

The X-ray diffraction analysis revealed that the crystalline product was composed of essentially pure SAPO-18.

The composition of the solid, calcined product was established, by means of chemical analysis, as $$37.2\% Al_2O_3, 1.79\% SiO_2, 61.0\% P_2O_5.$$

which produced a product composition, with regard to the main components, of $S_{0.002}Al_{0.45}P_{0.53}O_2$.

EXAMPLE 5
(SAPO-34.)

(a) A solution of 15.4 g of 85% phosphoric acid and 36.7 g of distilled water was added to 27.2 g of aluminium isopropoxide in a ¼ liter PE-bottle. The bottle was shaken for 1 minute. Next 4.0 g of Ludox LS-30 colloidal silica was added, and the bottle was again shaken for 1 minute. Then 49.2 g of 40% TEAOH was added. The composition of the resulting gel, expressed in terms of the molar oxide ratios, was:

$$1TEA_2O:1Al_2O_3:0.3SiO_2:1P_2O_5:64H_2O:6C_3H_7OH.$$

The bottle was shaken for 1 minute, and the mixture was transferred to a teflon-lined autoclave, and left over night on a shaking-board at room temperature. Next day the temperature was increased to 215° C., and the mixture was heated for 120 hours at this temperature. After cooling the product was washed with distilled water and centrifuged. A portion of the product was calcined in dry air at 550° C. for 5 hours. After calcination, the silico-alumino-phosphate mixed phase product has a crystalline structure whose X-ray powder diffraction pattern shows the following characteristic lines as indicated in Table 6 below.

TABLE 6

| 2θ | d(Å) | I |
|---|---|---|
| 9.41 | 9.39 | vvs |
| 12.82 | 6.90 | vs |
| 13.88 | 6.38 | w |
| 15.95 | 5.55 | m |
| 17.68 | 5.01 | m |
| 18.98 | 4.67 | vw |
| 20.55 | 4.32 | s |
| 21.92 | 4.05 | vw |
| 22.33 | 3.98 | vw |
| 22.99 | 3.87 | w |
| 24.83 | 3.58 | m |
| 25.86 | 3.44 | m |
| 27.60 | 3.23 | vw |
| 28.07 | 3.18 | vw |
| 29.48 | 3.03 | vw |
| 30.57 | 2.92 | m |
| 30.98 | 2.88 | w |
| 31.54 | 2.83 | vw |
| 33.37 | 2.68 | vw |
| 34.44 | 2.60 | vw |
| 35.91 | 2.50 | vw |
| 39.00 | 2.31 | vw |
| 39.63 | 2.27 | vw |

The X-ray diffraction analysis revealed that the crystalline product was composed of essentially pure SAPO-34.

The composition of the solid, calcined product was established, by means of chemical analysis, as 45.9%$Al_2O_3$, 9.6%$SiO_2$, 44.5%$P_2O_5$, which produced a product composition, with regard to the main components, of $Si_{0.095}Al_{0.533}P_{0.372}O_2$.

EXAMPLE 6

A physical mixture of SAPO-18 and SAPO-34 was prepared by mixing 1 g of the product form the first comparative example above (Example 4) with 1 g of the product form the second comparative example above (Example 5). The combined batch was mixed well, and was calcined in dry air at 550° C. for 5 hours. The calcined physical mixture so obtained had an X-ray powder diffraction pattern characterized by the following characteristic lines as indicated in Table 7 below.

TABLE 7

| 2θ | d(Å) | I |
|---|---|---|
| 9.43 | 9.37 | vvs |
| 10.55 | 8.38 | m |
| 12.84 | 6.89 | s |
| 13.36 | 6.62 | w |
| 13.90 | 6.37 | vw |
| 15.98 | 5.54 | m |
| 16.81 | 5.27 | m |
| 17.13 | 5.17 | m |
| 17.73 | 5.00 | w |
| 18.99 | 4.67 | w |
| 19.55 | 4.54 | vw |
| 19.92 | 4.45 | w |
| 20.57 | 4.31 | s |
| 21.27 | 4.17 | w |
| 21.94 | 4.05 | vw |
| 22.37 | 3.97 | vw |
| 23.03 | 3.86 | w |
| 23.83 | 3.73 | w |
| 24.91 | 3.57 | w |
| 25.89 | 3.44 | w |
| 26.19 | 3.40 | w |
| 27.72 | 3.22 | w |
| 29.54 | 3.02 | vw |
| 29.96 | 2.98 | vw |
| 30.59 | 2.92 | m |
| 31.06 | 2.88 | m |
| 32.09 | 2.79 | w |
| 34.47 | 2.60 | vw |
| 36.03 | 2.49 | vw |
| 39.68 | 2.27 | vw |

TABLE 8

An overview of the synthesis parameters of the patent examples and the comparative examples. See below for explanation of column headings.

| 1 ex | 2 gel Si | 3 template/Al | 4 phosphoric acid and water | 5 Y/N cooling | 6 Y/N filtration | 7 Y/N evaporation | 8 Y/N discharge | 9 cryst. temp. | 10 cryst. time hours |
|---|---|---|---|---|---|---|---|---|---|
| 1 | 0.019 | 0.79 | pre-mixed | 0 | 0 | 0.5 | 0 | 260 | 2 |
| 2 | 0.020 | 1 | separate | 0 | 0 | 0 | 0.2 | 260 | 4 |
| 3 | 0.018 | 0.4 | pre-mixed | 0 | 0.4 | 0.3 | 0 | 260 | 4 |
| 4 | 0.018 | 1 | separate | 1 | 0.4 | 0 | 0 | 215 | 120 |
| 5 | 0.070 | 1 | pre-mixed | 0 | 0 | 0 | 0 | 215 | 120 |

The data in Table 8 are organised in 10 columns representing the following data;
1. Example number.
2. Silicon content in gel - as Si/(Si + Al + P).
3. Amount of template, TEAOH/Al-relation in gel.
4. Premixing of water and phosphoric acid; 1. Water added first and then phosphoric acid; 0.15.
5. Cooling of gel during hydrolysis of Al-isopropoxide. Yes = 1, No = 0.

TABLE 8-continued

An overview of the synthesis parameters of the patent examples and
the comparative examples. See below for explanation of column headings.

| 1 ex | 2 gel Si | 3 template/Al | 4 phosphoric acid and water | 5 Y/N cooling | 6 Y/N filtration | 7 Y/N evaporation | 8 Y/N discharge | 9 cryst. temp. | 10 cryst. time hours |
|---|---|---|---|---|---|---|---|---|---|

6. Filtration of gel before template was added. Number represents fraction weight reduction.
7. Evaporating AlPO-gel by heating to <100° C. over night. Number represents fraction weight reduction.
8. Fraction and total gel discharged after sedimentation after addition of template.
9. Crystallisation temperature ° C..
10. Crystallisation time in hours from heating was started.

TABLE 9

An overview of phase composition and catalytic data of the patent examples and the comparative examples.
For samples tested more than once, mean values are given.

| 1 ex | 2 % SAPO-18 | 3 % SAPO-34 | 4 % SAPO-5 | 5 % misc | 6 18/34 | 7 sum 18 + 34 | 8 h/w 4.9Å | 9 crystallite size | 10 catal. life time (min) | 11 % ethene at tDME |
|---|---|---|---|---|---|---|---|---|---|---|
| 1 | 30 | 44 | 0 | 0 | 0.68 | 74 | 1 | 0.05 | 830* | 47.5* |
| 2 | 25 | 20 | 29 | 15 | 1.25 | 45 | 2.4 | n.m | 715 | 46.7 |
| 3 | 38 | 20 | 2 | 0 | 1.9 | 58 | 2 | 0.1 | 770 | 43.3 |
| 4 | 100 | 0 | 0 | 0 |  | 100 | 21 | 0.1 | 355 | 44.6 |
| 5 | 0 | 100 | 0 | 0 | 0 | 100 | 60 | 0.2 | 370* | 48.4* |

*Has been tested four times and the value given is the mean value
n.m.; not measured
The data in Table 9 are organised in 11 columns representing the following data;
1. Example number.
2. Content of AEI-component determined as intensity of the 5.27 Å-peak (±0.02Å). Example 4 product used as reference = 100%.
3. Content of CHA-component determined as intensity of the 5.55 Å-peak (±0.03Å) minus the intensity of the 5.27 Å-peak. Example 5 product used as reference = 100%.
4. Content of AFI-component estimated from the sum of the intensities of the 19.7Å + the 22.4 Å-peak. A pure and well crystalline SAPO-5 used as reference = 100%.
5. Content of other phases, mostly dense quartz- or cristobalite analogues.
6. The ratio of AEI/CHA in the sample calculated from the values in columns 2 and 3.
7. Sum of AEI + CHA, i.e. column 2 + column 3. These values are referred to as "overall crystallinity" in the text but are in fact only the overall intensity of selected peaks in the diffractograms.
8. The height/width at half height of the 4.9Å peak.
9. Minimum crystal dimension as observed on SEM-micrographs, i.e. the shortest side of a crystal that can be identified as AEI or CHA by its flat square or cubic shape, respectively.
10. Catalytic lifetime in minutes, defined as the time when DME approaches 1% on carbon basis in the product stream. For samples tested more than once mean values are given.
11. Ethylene in product stream at $t_{DME}$ measured as weight % on carbon basis.

The data in Table 9 are organised in 11 columns representing the following data;
1. Example number.
2. Content of AEI-component determined as intensity of the 5.27 Å-peak (±0.02 Å). Example 4 product used as reference=100%.
3. Content of CHA-component determined as intensity of the 5.55 Å-peak (±0.03 Å) minus the intensity of the 5.27 Å-peak. Example 5 product used as reference =100%.
4. Content of AFI-component estimated from the sum of the intensities of the 19.7 Å+the 22.4 Å-peak. A pure and well crystalline SAPO-5 used as reference=100%.
5. Content of other phases, mostly dense quarz- or cristobalite analogues.
6. The ratio of AEI/CHA in the sample calculated from the values in columns 2and 3.
7. Sum of AEI+CHA, i.e. column 2+column 3. These values are referred to as "overall crystallinity" in the text but are in fact only the overall intensity of selected peaks in the diffractograms.
8. The height/width at half height of the 4.9 Å peak.
9. Minimum crystal dimension as observed on SEM-micrographs, i.e. the shortest side of a crystal that can be identified as AEI or CHA by its flat square or cubic shape, respectively.
10. Catalytic lifetime in minutes, defined as the time when DME approaches 1% on carbon basis in the product stream. For samples tested more than once mean values are given.
11. Ethylene in product stream at $t_{DME}$ measured as weight % on carbon basis.

What is claimed is:

1. A microporous crystalline silico-alumino-phosphate composition, the theoretical composition of which, on a water-free base after synthesis and calcination, is:

$$H_w Si_x Al_y P_z O_2$$

where w and x have a value between 0.01 and 0.05 and y and z are values between 0.4 and 0.6, wherein the composition is a mixed phase product comprising silico-alumino-phosphates of AEI and CHA structure prepared in one batch crystallization, not including mere physical mixtures, the product after calcination in air at 550° C. for 4 hours, produces a characteristic X-ray diffractogram having at least the reflections as shown in the following table:

| 2θ | d(Å) |
|---|---|
| 9.3–9.5 | 9.3–9.4 |
| 10.4–10.6 | 8.3–8.5 |
| 12.7–12.9 | 6.8–7.0 |
| 13.8–14.0 | 6.3–6.4 |
| 15.9–16.1 | 5.5–5.6 |
| 16.7–16.9 | 5.2–5.3 |
| 18.9–19.0 | 4.6–4.7 |
| 20.5–20.7 | 4.3–4.4 |
| 21.0–21.3 | 4.1–4.3 |
| 23.7–24.0 | 3.7–3.8 |
| 25.7–26.0 | 3.4–3.5 |
| 30.9–31.1 | 2.8–2.9 | and having XRD-profiles with only one broad feature in the region between 16.6 and 18 degrees 2 theta as marked with an asterisk in FIG. 1 of this application.

2. A silico-alumino-phosphate composition according to claim 1, wherein the composition comprises at least SAPO-18/SAPO-34 intergrowths.

3. A silico-alumino-phosphate composition according to claim 2, wherein the phase ratio of SAPO-34 and SAPO-18 is between 4:1 and 1:4.

4. A silico-alumino-phosphate composition according to claim 3, wherein the phase ratio of SAPO-34 and SAPO-18 is between 2:1 and 1:2.

5. A silico-alumino-phosphate composition according to claim 1, which has a characteristic X-ray diffractogram as shown in the following table:

| 2θ | d(Å) | I |
|---|---|---|
| 9.41 | 9.39 | vvs |
| 10.55 | 8.38 | w |
| 12.83 | 6.90 | m |
| 13.30 | 6.65 | w |
| 13.89 | 6.37 | vw |
| 15.96 | 5.55 | m |
| 16.77 | 5.28 | w |
| 18.94 | 4.68 | w |
| 19.62 | 4.52 | vw |
| 20.55 | 4.32 | m |
| 21.17 | 4.19 | w |
| 23.04 | 3.86 | w |
| 23.81 | 3.73 | vw |
| 25.89 | 3.44 | w |
| 30.99 | 2.88 | w. |

6. A silico-alumino-phosphate composition according to claim 1, which has a characteristic X-ray diffractogram as shown in the following table:

| 2θ | d(Å) | I |
|---|---|---|
| 7.33 | 12.05 | vvs |
| 9.42 | 9.33 | vvs |
| 10.51 | 8.41 | w |
| 12.78 | 6.92 | m |
| 13.86 | 6.38 | vw |
| 14.77 | 5.99 | w |
| 15.97 | 5.54 | w |
| 16.82 | 5.27 | w |
| 18.96 | 4.68 | vw |
| 19.60 | 4.53 | m |
| 20.56 | 4.32 | m |
| 21.11 | 4.20 | m |
| 21.72 | 4.09 | m |
| 22.30 | 3.98 | m |
| 23.94 | 3.71 | vw |
| 25.79 | 3.45 | m |
| 28.95 | 3.08 | vw |
| 29.86 | 2.99 | w |
| 31.02 | 2.88 | w |
| 34.36 | 2.61 | w |
| 35.72 | 2.51 | vw |
| 37.79 | 2.38 | vw. |

7. A silico-alumino-phosphate composition according to claim 1, which has a characteristic X-ray diffractogram as shown in the following table:

| 2θ | d(Å) | I |
|---|---|---|
| 7.32 | 12.07 | w |
| 9.44 | 9.36 | vvs |
| 10.53 | 8.40 | w |
| 12.85 | 6.89 | m |
| 13.34 | 6.63 | w |
| 13.86 | 6.39 | vw |
| 16.02 | 5.53 | m |
| 16.84 | 5.26 | w |
| 18.97 | 4.67 | w |
| 20.60 | 4.31 | m |
| 21.20 | 4.19 | w |
| 22.34 | 3.98 | vw |
| 23.00 | 3.86 | vw |
| 23.86 | 3.73 | w |
| 25.91 | 3.44 | w |
| 27.86 | 3.20 | vw |
| 31.04 | 2.88 | w |

8. Catalytic material comprising silico-alumino-phosphates, wherein the material comprises a mixed phase composition of SAPO-materials according to those defined in claim 1, with AEI and CHA structure in a phase ratio between 4:1 and 1:4.

9. Catalytic material according to claim 8, wherein the AEI and CHA structure is in a phase ratio between 2:1 and 1:2.

10. Catalytic material according to claim 8, wherein the material comprises a mixed phase composition of SAPO-34 and SAPO-18, and the sum of the phases of SAPO-34 and SAPO-18 comprises at least 40% of the total material.

11. Catalytic material according to claim 8, wherein the silico-alumino-phosphates have a crystal size in the range 0.001–10 μm.

12. Catalytic material according to claim 11, wherein the silico-alumino-phosphates have a crystal size in the range 0.01–1 μm.

13. Catalytic material according to claim 8, wherein the XRD-profile of the mixed phase product exhibits a 4.9 Å-reflection whose height over width is lower than for the separate phases of which the mixed phase product is comprised.

14. Catalytic material according to claim 13, wherein the XRD-profile of the mixed phase product exhibits a 4.9 Å-reflection whose height over width is below 3.

15. In a process for production of olefins from methanol in the presence of a catalyst, the improvement which comprises using the catalytic material of claim 8 as the catalyst.

* * * * *

UNITED STATES PATENT AND TRADEMARK OFFICE
CERTIFICATE OF CORRECTION

PATENT NO.    : 6,334,994 B1
DATED         : January 1, 2002
INVENTOR(S)   : Rune Wendelbo et al.

It is certified that error appears in the above-identified patent and that said Letters Patent is hereby corrected as shown below:

This certificate supersedes Certificate of Correction issued August 13, 2002, the number was erroneously mentioned and should be vacated since no certificate of correction was granted.

Signed and Sealed this

Tenth Day of December, 2002

JAMES E. ROGAN
*Director of the United States Patent and Trademark Office*